United States Patent [19]
Garrett, Jr.

[11] Patent Number: 5,893,398
[45] Date of Patent: Apr. 13, 1999

[54] AIRCRAFT SERVICING SYSTEM AND METHOD

[76] Inventor: Detrolia Garrett, Jr., 5114-B N. Rider Dr., Shaw, S.C. 29152

[21] Appl. No.: 08/883,877

[22] Filed: Jun. 27, 1997

[51] Int. Cl.[6] .................................................. B65B 3/00
[52] U.S. Cl. .......................... 141/231; 141/86; 141/88; 141/98; 141/382; 222/108; 222/608; 137/312; 137/899
[58] Field of Search .......................... 141/2, 86, 88, 141/94, 95, 98, 382; 222/108, 608, 626, 627; 137/312, 313, 351, 899, 899.4; 220/571; 280/834, 836–839

[56] References Cited

U.S. PATENT DOCUMENTS

| | | | |
|---|---|---|---|
| 1,311,981 | 8/1919 | Lucius | 280/838 |
| 1,718,393 | 6/1929 | Thompson | 141/98 |
| 1,727,609 | 9/1929 | Kramer | 410/68 |
| 1,764,057 | 6/1930 | Steinhauer | 222/627 |
| 1,844,530 | 2/1932 | Thwaits | 280/838 |
| 1,989,940 | 2/1935 | McGaughan et al. | 137/234.6 |
| 2,056,179 | 10/1936 | Fitch | 410/68 |
| 2,421,765 | 6/1947 | Taylor | 222/135 |
| 2,498,229 | 2/1950 | Adler | 141/26 |
| 3,257,031 | 6/1966 | Dietz | 222/627 |
| 3,604,719 | 9/1971 | Kerr | 280/839 |
| 3,650,303 | 3/1972 | Chambers et al. | 141/98 |
| 3,814,148 | 6/1974 | Wostl | 141/98 |
| 3,907,168 | 9/1975 | Davis et al. | 222/76 |
| 4,114,661 | 9/1978 | Harris | 141/231 |
| 4,131,214 | 12/1978 | Rogers | 222/608 |
| 4,144,905 | 3/1979 | Henderson, deceased | 141/231 |
| 4,911,330 | 3/1990 | Vlaanderen et al. | 222/132 |
| 4,981,272 | 1/1991 | Cutore | 244/135 A |
| 4,988,020 | 1/1991 | Webb | 222/608 |
| 5,042,840 | 8/1991 | Rieple et al. | 280/830 |
| 5,052,443 | 10/1991 | Evangelist, Jr. | 137/899 |
| 5,154,314 | 10/1992 | Van Wormer | 222/608 |
| 5,197,627 | 3/1993 | Disabato et al. | 220/571 |
| 5,467,827 | 11/1995 | McLoughlin | 169/24 |
| 5,507,326 | 4/1996 | Cadman et al. | 141/231 |
| 5,515,881 | 5/1996 | Ballew | 141/86 |

*Primary Examiner*—J. Casimer Jacyna
*Attorney, Agent, or Firm*—Michael A. Mann; Nexsen Pruet Jacobs & Pollard LLP

[57] ABSTRACT

A system and method for servicing aircraft on a flight line away from a maintenance terminal comprises a first set of vehicles for servicing the aircraft directly and a second set of vehicles for servicing the service vehicles. The first set of vehicles requires fuel and oil in order to operate; the second set brings fuel and oil to the first set to make it unnecessary for the first set to halt aircraft servicing in order to return to the terminal. The second set of vehicles includes a trailer with three tanks, one for jet fuel, one for diesel fuel and one for oil. The tanks are placed on a catch basin carried on a trailer. Each has a tapered bottom with a drain and an inlet port at the top with a funnel-shaped collar. Each tank also carries its own transfer hose with a manual pump and has a sight guage, ground cable, lifting rings and lifting handles.

12 Claims, 3 Drawing Sheets

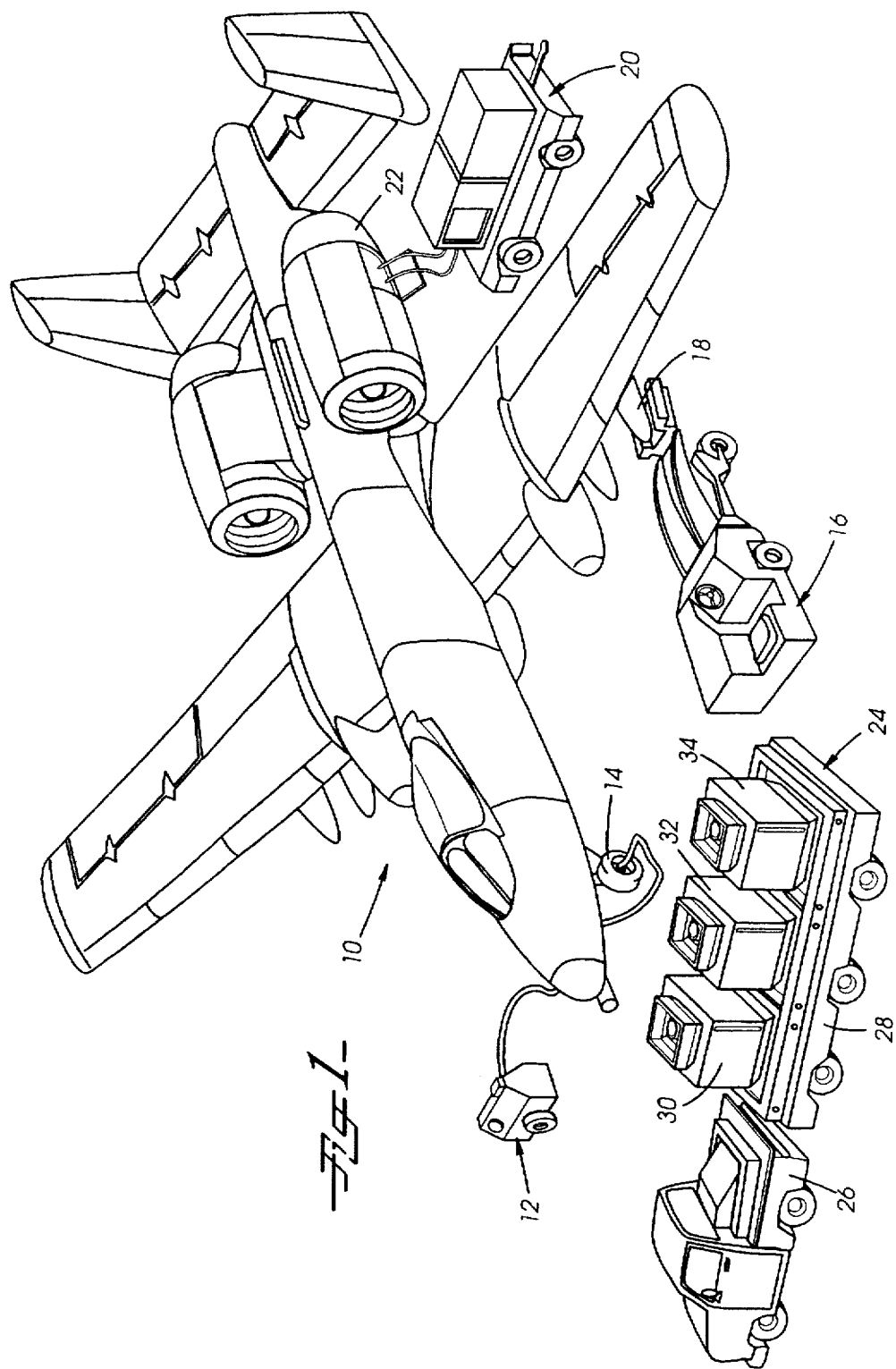

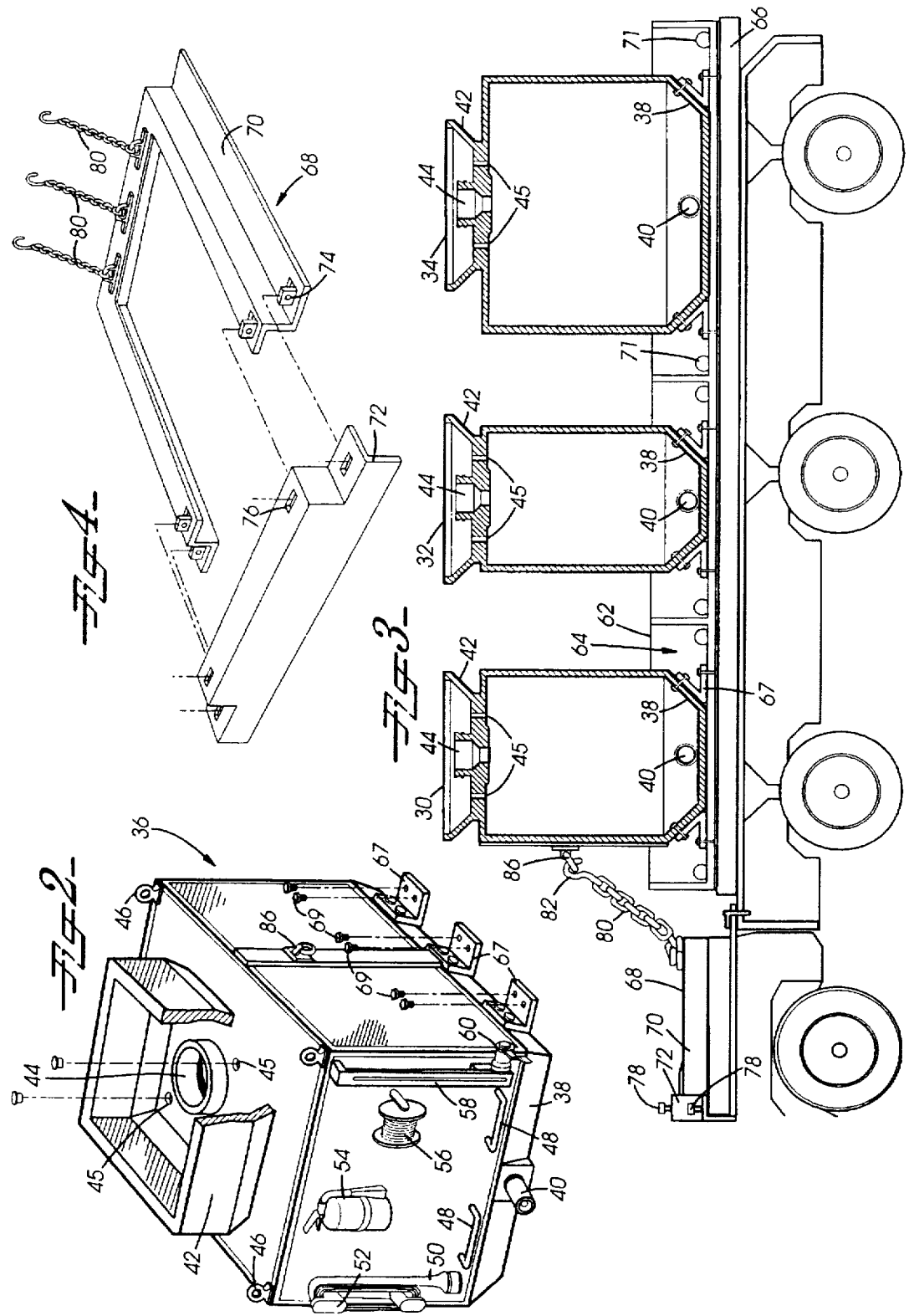

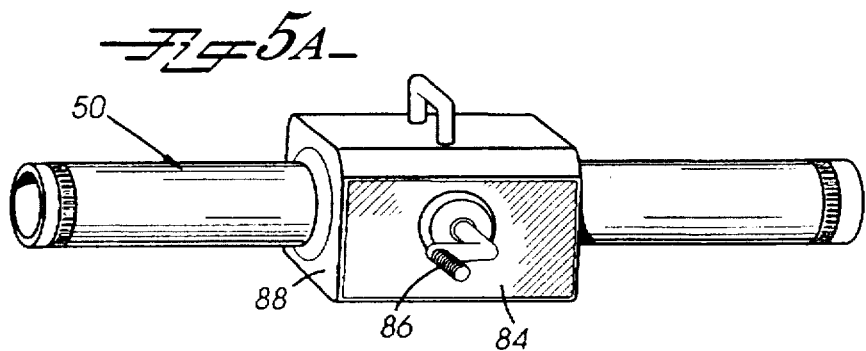
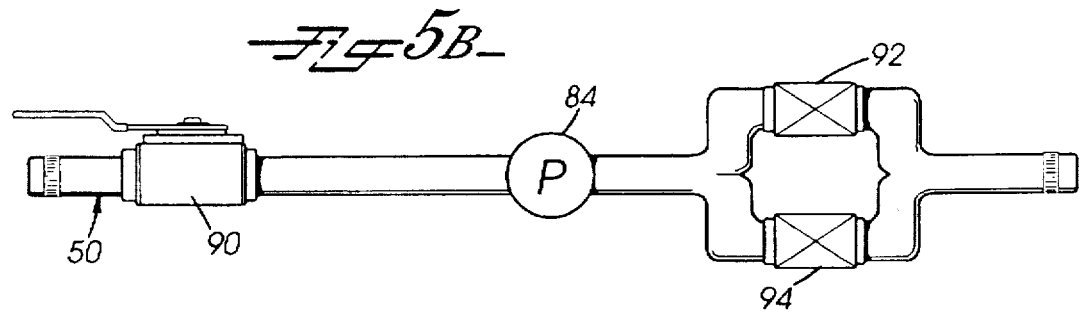
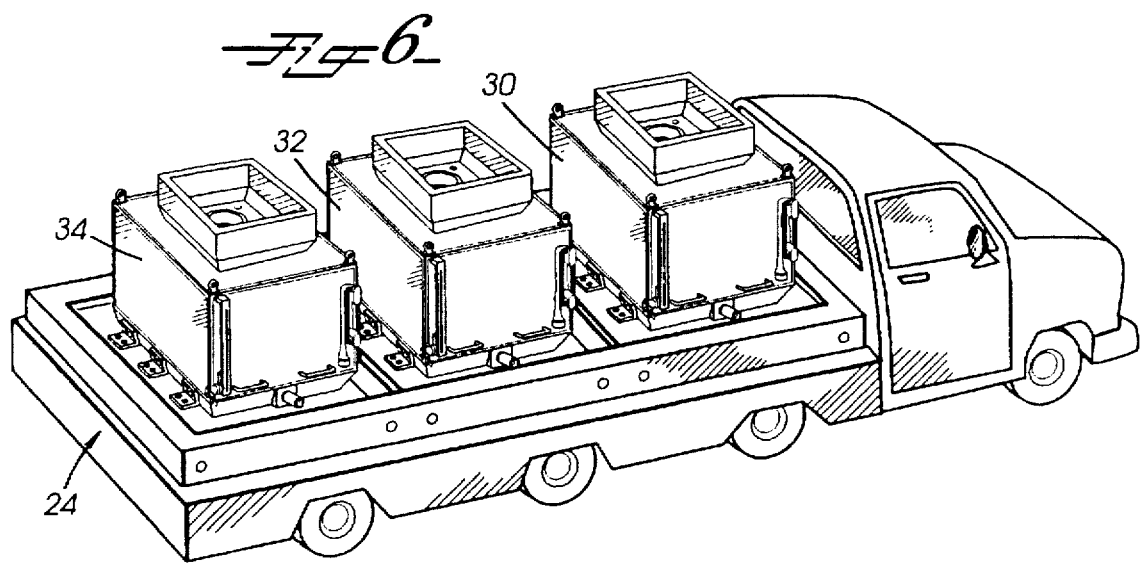

5,893,398

1

AIRCRAFT SERVICING SYSTEM AND METHOD

BACKGROUND OF THE INVENTION

1. Field of the Invention

The present invention relates generally to aircraft servicing. More particularly, the present invention is a system and method for servicing aircraft in which some vehicles are used to service the aircraft, and other vehicles refuel and service the servicing vehicles so that the servicing vehicles do not have to leave the flight line.

2. Discussion of Background

Aircraft servicing is well known. When aircraft have returned from a flight, various tasks are performed to prepare the plane for return to the air. In addition to refueling and checking oil levels, the safety systems are reviewed, such as the hydraulic systems that operate the landing gear and controls. For military aircraft, munitions may be replaced.

Civilian aircraft are generally serviced in hangers at airports. Military aircraft are serviced on the flight line, where a row of aircraft are parked away from a maintenance terminal and nearer to the runway, to be ready for mobilization. The distance from the flight line to the maintenance terminals may be as much as one mile.

Servicing of aircraft, particularly military aircraft, is typically done by shuttling service vehicles out to the flight line from the maintenance terminal where they perform the requisite service. Periodically, the servicing vehicles return to the maintenance terminal for themselves to be refueled or for other servicing. These repeated trips take time. Furthermore, if the servicing vehicle needs to be refueled after a sequence of tests using that vehicle has been started, these tests may need to be rested once the servicing vehicle returns.

There remains a need for a more efficient method for servicing aircraft.

SUMMARY OF THE INVENTION

According to its preferred aspects and briefly described, the present invention is a system and method for servicing aircraft. In particular, the system comprises a first set of vehicles for servicing the aircraft directly and a second set of vehicles for servicing the first set of vehicles. In particular this second set provides fuel and oil to the vehicles of the first set so that the vehicles of the first set do not have to return to the maintenance terminal as frequently. A vehicle of the second set includes a tank for fuel, one for diesel fuel, and one for oil, each tank having a drain, a transfer hose with a hand pump, a fire extinguisher, an inlet port, a funnel-shaped collar around the inlet port, a sight level, and lifting rings. The tanks rest on a catch basin to prevent contamination of the ground or runway area. The vehicle may be self-propelled or towed. In either configuration, it would be adapted to transfer fuel from the towing vehicle or its own fuel tank if fuel was needed beyond that in the fuel tank.

A feature of the present invention is the use of one vehicle of the second set to service several vehicles of the first set by providing them with, for example, fuel and oil. By doing so, the need for periodic returns to the maintenance terminal are obviated so the vehicles of the first set can continue servicing aircraft. When the maintenance terminal is a mile or so away, the trip to and from the flight line can take fifteen minutes or more. If each vehicle of the first set must stop servicing aircraft from time to time to return to the maintenance terminal, servicing must be interrupted numerous times during a day with the attendant delays. The present system prevents those interruptions. In the context of a military airbase or a busy commercial airport, avoiding these interruptions would save significant amounts of time and money.

Furthermore, by simply supplying a small, "topping-up" (or enough to get by until the next refill) quantity of fuel or oil to each vehicle of the first set, the fuel and oil of the second set vehicle can be spread out over a large number of servicing vehicles and can make the most of each of its trips to the maintenance terminal. Furthermore, sometimes a small amount of additional fuel will allow a service vehicle of the first set to complete its servicing. Failure to complete servicing, such as for example, safety checks, may require that the servicing be started over from the beginning once it is resumed. Therefore, the impact of having just a little more fuel at the right time may be the avoidance of a substantial delay.

Other features of the present invention are the combination of structural elements of the second vehicle that make it especially appropriate for its intended purpose, including the fact that individual tanks can be lifted clear of the trailer for replacement by full ones, the spill-catching funnel, and easy-draining shape.

These and other features and their advantages will become apparent to those skilled in the art of aircraft maintenance and servicing from a careful reading of the Detailed Description of Preferred Embodiments accompanied by the following drawings.

BRIEF DESCRIPTION OF THE DRAWINGS

In the drawings:

FIG. 1 is a perspective view of an aircraft being serviced by the servicing vehicles of the first and second set, according to a preferred embodiment of the present invention;

FIG. 2 is a detailed perspective view of a tank of the vehicle of the second set of service vehicles, according to a preferred embodiment of the present invention;

FIG. 3 is a side, cross-sectional view of a vehicle of the second set according to a preferred embodiment of the present invention;

FIG. 4 illustrates a bracket for securing the vehicle of FIG. 3 to a typical utility towing vehicle at an airport;

FIGS. 5A and B illustrate a hose for use with the tank of FIG. 2 in perspective and schematically; and FIG. 6 illustrates in perspective a vehicle of the second set according to an alternate preferred embodiment of the present invention.

DETAILED DESCRIPTION OF PREFERRED EMBODIMENTS

The present invention is a system and method for servicing aircraft. Servicing aircraft may include one or more of the following services: refueling, adding and replacing oil and hydraulic fluids, safety and operating system verification, cleaning, checking tire pressure, recharging batteries, replacing munitions in the case of military aircraft, and replenishing supplies. Typically, there are service vehicles known in the prior art that provide these services. For example, there are diesel generators to provide electrical power to the aircraft while it is being serviced so that its batteries are not being discharged. There are hydraulic test stands to test the landing gear. There are also compressors to provide service for a variety of tools and for inflating tires. Service requirements may vary from one type of aircraft to another and from commercial to military. All types of servicing vehicles are included in the present invention.

The vehicles that service aircraft, which are included by definition in a first set of service vehicles, require fuel and oil for their own continued operation. The fuel may be gasoline, jet fuel (JP4 or JP8) or diesel fuel and is likely to be stored in or near a maintenance terminal. For example, a diesel generator will require diesel fuel in order to continue to supply electricity for an aircraft where the electrical system of the aircraft must be activated for testing. Normally, that generator must be towed back to the maintenance terminal when it needs to be refueled. In the present invention a vehicle of the second set supplies fuel and oil to the generator so that it can continue to operate. Thus, as the terms first set and second set are used herein, vehicles of the first set service the aircraft; vehicles of the second set service the service vehicles.

In a flight line where there are a number of aircraft, there may be dozens of vehicles of the first set servicing dozens of aircraft. At least one vehicle of the second set will be circulating among these, topping them up with fuel and oil so that none of the first set vehicles need to return to the maintenance terminal for fuel or oil during the work day. Ideally, a second vehicle of the second set is arriving fully loaded from the maintenance terminal as another second set vehicle is emptying its fuel load.

As best seen in FIG. 1, there is a military aircraft 10 being serviced by three vehicles of the first set: a compressor 12 is inflating the tires 14, a bomb loader 16 is loading a bomb 18, and a third vehicle 20 is servicing one of the jet engines 22. Servicing these vehicles 12, 16 and 20 of the first set is a vehicle 24 of the second set, comprising a tow truck 26 and a trailer 28. Trailer 28 has three tanks 30, 32 and 34, best seen in FIGS. 2 and 3, for carrying diesel fuel, jet fuel and oil. It will be apparent that an alternative design for trailer 28 is one that is self-propelled, as illustrated in FIG. 6. The reference numerals for corresponding components in FIGS. 1 and 6 are the same.

FIG. 2 illustrates a typical configuration for a tank 36 representative of tanks 30, 32, and 34. Each tank 36 is made of a material that is reasonably rigid and resistant to attack by the fluid it is designed to contain. Steel or polyethylene are suitable materials. Each tank has a tapered bottom 38 to facilitate drainage of its contents through drain 40 and a funnel-shaped top 42 to catch spills when it is being filled at its inlet post 44. Air vents 45 allow air to escape from tank 36 when it is being filled and air to enter when it is being drained. Lifting rings 46 on the top of tank 36 are suitable for attaching hooks when using a crane for lifting tank 36. Alternatively, and when empty, lifting handles 48 are provided on opposing sides for lifting manually. Each tank 36 has a hose 50 and a bracket 52 for storing it, a fire extinguisher 54, a grounding cable 56 on a sol, and a sight level 58 to guage by sight the amount of fluid remaining in tank 36. A level guage shut-off valve 60 is used to isolate the level guage for maintenance.

Trailer 28 has wails 62 that define a catch basin 64 for spills, and preferably to isolate the spills from tanks 30, 32, 34 from each other. Catch basin 64 is placed over a layer 66 of rubber or other resilient material and then fastened to trailer 28. Each tank 30, 32, 34 is secured to basin 64 using angled brackets 67 held to basin 64 using bolts 69. Drain holes 71 permit the catch basin 64 to be drained in the event of spills or if it collects rainwater.

If towed by standard aircraft towing truck 26, a two-piece bracket 68 can be used to secure trailer 28. Bracket 68 is essentially a frame that surrounds a fifth wheel or other equivalent structures common to the bed of utility tow trucks used in connection with aircraft at terminals. Bracket 68 has a first part 70 and a second part 72 that secures to first part 70 in any convenient way, such as for example, pins 74 on first part 70 and holes 76 on second part 72. Holes 76 are dimensioned for receiving pins 74. Clips 78 prevent pins 74 from slipping out of holes 76.

First part 70 also includes at least one safety chain 80 to be attached to a safety ring 82 on t 30, as the rearmost tank.

The transfer hose 50 is shown in more deal in FIGS. 5A and 5B, in perspective in FIG. 5A and in a schematic view in 5B. Hose 50 has a manual pump 84 to start the flow of fluid. Manual pump 84 is operated by turning a handle 86 clockwise for fluid flow in one direction and counter-clockwise for fluid flow in the opposite direction. The pump is inside a housing 88 that contains several other components as illustrated in FIG. 55B, namely, a shutoff valve 90 and two one-way filters 92 and 94 to assure that the flow of fluid only goes in the direction desired and dirt and debris are filtered out.

In operation, tow truck 26 pulls trailer 28 from the maintenance terminal to the flight line after tanks 30, 32, and 34 have been filled with diesel fuel, oil and jet fuel. At the flight line, tow truck 26 takes trailer 28 from one service vehicle of the first set to the next, adding small quantities to each of them or most of them, preferably just topping up their levels of fuel and oil until tanks 30, 32, and 34 are empty.

To fill tank 36, ground cable 56 is unrolled from the reel it is on and placed on the ground. Next, the shutoff valve of tank 36 is checked to be certain it is closed. After opening inlet port 44 and air vents 45, the tanks are filled. After failing, inlet port 44 and air valves 45 are closed, cable 56 is rolled back onto its reel, and tow truck 26 pulls trailer 28 to the flight line.

There, after dropping cable 56, one end of transfer hose 50 is connected to drain 40 and the other end put into the inlet tank of the vehicle being refueled, shutoff valve 60 of tank 36 is opened, and then hose valve 90 is opened. Manual pump 84 is operated to cause fluid to flow from tank 36 until the vehicle tank is approximately one-fourth full, then shutoff valve 6 is closed but manual pump 8 continues to be operated until the fluid stops. Then hose shutoff valve 9 is closed. Hose 50 can then be disconnected and placed in catch basin 64.

It will be apparent to those of ordinary skill in the art that many substitutions and modifications can be made to the preferred embodiments just described without departing from the spirit and scope of the present invention, which is defined by the appended claims.

What is claimed is:

1. A vehicle for use in servicing aircraft in a flight line where said aircraft are serviced by a first set of servicing vehicles, said vehicle comprising:

a trailer having a catch basin thereon wherein said trailer includes a resilient layer under said catch basin;

a first tank carried in said catch basin and adapted for holding jet fuel;

a second tank carried in said catch basin and adapted for holding oil;

a third tank adapted for holding diesel fuel;

a first hose for transferring fuel to said first set of servicing vehicles; and a second hose for transferring oil to said first set of servicing vehicles.

said catch basin formed to catch spills of jet fuel and oil from said first and said second tanks and formed to keep caught oil and fuel separate from each other.

2. The vehicle as recited in claim 1, wherein said first hose and said second hose include manual pumps for pumping said jet fuel and oil therethrough.

3. The vehicle as recited in claim 1, wherein said first and said second tanks have tops and bottoms, said bottoms of said first and said second tanks being tapered and having drain holes, said tops of said first and said second tanks having inlet ports.

4. The vehicle as recited in claim 1, wherein said first and said second tanks have lifting rings and lifting handles.

5. The vehicle as recited claim 1, wherein said first and said second tanks have inlet ports and funnel-shaped collars around said inlet ports.

6. The vehicle as recited in claim 1, wherein said vehicle further comprises a bracket for use in towing said trailer, said bracket having a first part and a second part pinable to said first part.

7. The vehicle as recited in claim 1, further comprising a grounding cable carried by and in electrical connection with said tank.

8. The vehicle as recited in claim 1, wherein said vehicle further comprises a bracket for use in towing said trailer and a grounding cable carried by and in electrical connection with said tanks.

9. The vehicle as recited in claim 1, wherein said first, said second and said third tanks have lifting rings, lifting handles, tops and bottoms, said bottoms of said first, said second and said third tanks having drain holes.

10. The vehicle as recited in claim 1, wherein said first, said second and said third tanks have lifting rings and lifting handles wherein said first, said second and said third tanks have tops and bottoms, said bottoms of said first, said tops of said first, said second and said third tanks having inlet ports.

11. The vehicle as recited in claim 1, wherein said first, said second and said third tanks have inlet ports and funnel-shaped collars around said inlet ports.

12. The vehicle as recited in claim 1, wherein said vehicle further comprises:

a grounding cable carried by and in electrical connection with said tanks; and a bracket for use in towing said trailer, said bracket having a first part and a second part pinable to said first part.

\* \* \* \* \*